United States Patent [19]

Kono et al.

[11] Patent Number: 4,462,491
[45] Date of Patent: * Jul. 31, 1984

[54] APPARATUS FOR CONTROLLING A DRIVING FORCE APPLIED TO A COMPRESSOR

[75] Inventors: Hiroya Kono; Jun Hasegawa, both of Kariya; Mitsukane Inagaki, Anjo; Hisao Kobayashi, Kariya, all of Japan

[73] Assignees: Kabushiki Kaisha Toyoda Jidoshokki Seisakusho; Toyota Jidosha Kabushiki Kaisha; Nippondenso Co., Ltd., all of Aichi, Japan

[ * ] Notice: The portion of the term of this patent subsequent to Jul. 19, 2000 has been disclaimed.

[21] Appl. No.: 287,876

[22] Filed: Jul. 29, 1981

[30] Foreign Application Priority Data

Aug. 9, 1980 [JP] Japan ................... 55-109486

[51] Int. Cl.$^3$ .................. F04B 49/02; F04B 49/06; F16D 43/24
[52] U.S. Cl. .................. 192/84 R; 192/103 R; 192/104 R; 192/150; 417/319; 62/133
[58] Field of Search .......... 192/56 R, 84 R, 103 R, 192/150, 104 R; 417/222, 319; 62/133, 323.4

[56] References Cited

U.S. PATENT DOCUMENTS

| 3,121,314 | 2/1964 | Koyanagi | 62/133 |
| 3,141,103 | 7/1964 | Asano | 192/84 |
| 3,400,795 | 9/1968 | Miller | 192/103 R |
| 3,686,891 | 9/1972 | Wills | 62/323.4 X |
| 3,915,271 | 10/1975 | Harper | 192/103 R X |
| 4,232,772 | 11/1980 | Brissey et al. | 192/56 R X |
| 4,393,966 | 7/1983 | Kono et al. | 192/103 R |

Primary Examiner—Rodney H. Bonck
Assistant Examiner—James J. Merek
Attorney, Agent, or Firm—Burgess, Ryan & Wayne

[57] ABSTRACT

An apparatus for controlling a driving force transmitted from a vehicle engine, via an electromagnetic clutch, to a compressor for a vehicle air conditioning equipment being provided with at least a sensor detecting the revolving rate of the compressor, and a clutch controller for providing a signal to disengage the electromagnetic clutch when the revolving rate of the compressor detected by the sensor is reduced below a prescribed reference revolving rate.

4 Claims, 5 Drawing Figures

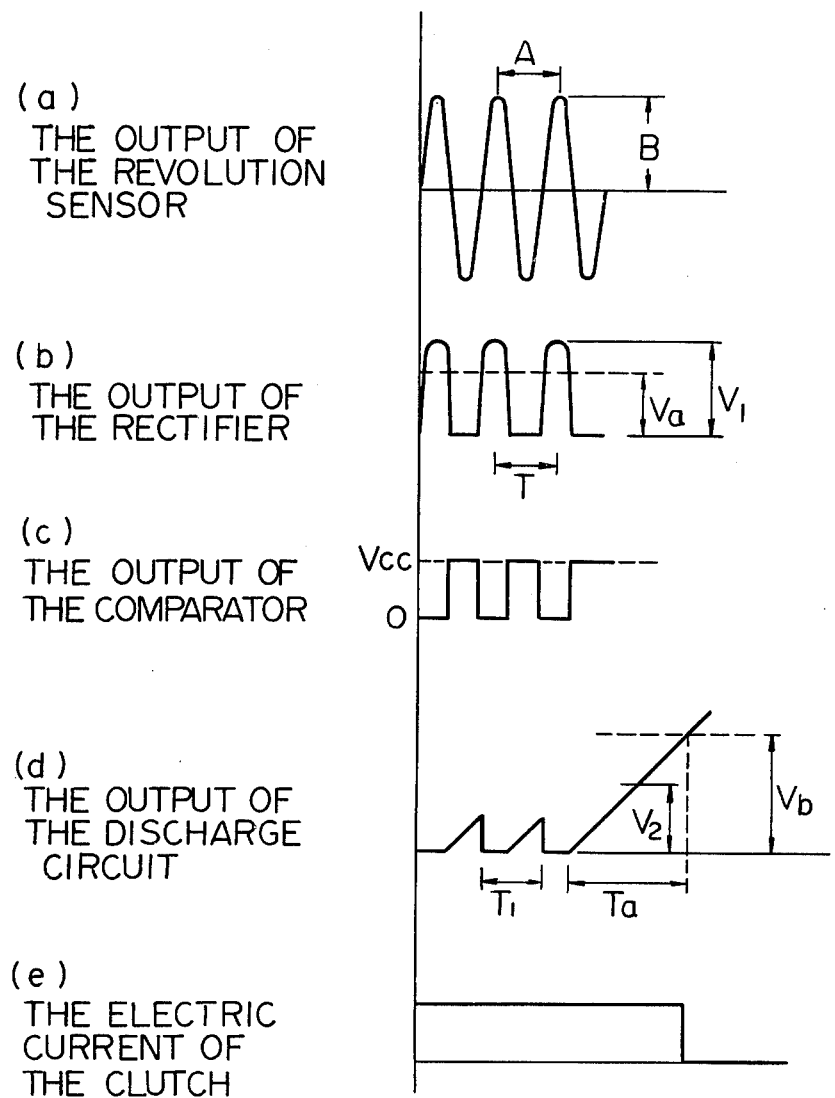

APPARATUS FOR CONTROLLING A DRIVING FORCE APPLIED TO A COMPRESSOR

DESCRIPTION OF THE INVENTION

The present invention relates to an apparatus for controlling a driving force applied to a compressor and, in particular, to an apparatus which interrupts the transmission of the driving input to the compressor when something wrong occurs in the compressor.

The compressor of a vehicle air conditioning equipment is driven by the vehicle engine through transmission belts and a clutch; therefore, the seizure in the compressor resulting from faulty lubrication of the sliding surfaces of the compressor or the standstill of the compressor caused by damages or breakage of the component parts of the compressor becomes a resistance to the operation of the engine, causes an excessive increase in the load of the engine, and thus results in the breakage of the power transmission belts and, particularly in a system wherein various auxiliary equipments, such as the water pump and cooling fan of the cooling system of the engine, the generator and the compressor, are driven by a single power transmission belt, the breakage of the power transmission belt causes the engine to overheat, resulting in serious damage to the engine.

Accordingly, an object of the present invention is to provide an apparatus for controlling the compressor driving force, which apparatus comprises a revolution sensor capable of detecting the revolution rate of the compressor and being adapted to interrupt the driving input to the compressor when the revolution rate detected is lower than a reference revolution rate, and thereby, to prevent destructive damage in the compressor and the serious damage to the engine.

BRIEF DESCRIPTION OF THE DRAWINGS

FIG. 5 is a diagram illustrating the relationship between the outputs of the respective components of the third embodiment.

DETAILED DESCRIPTION OF THE INVENTION

Figure 1:
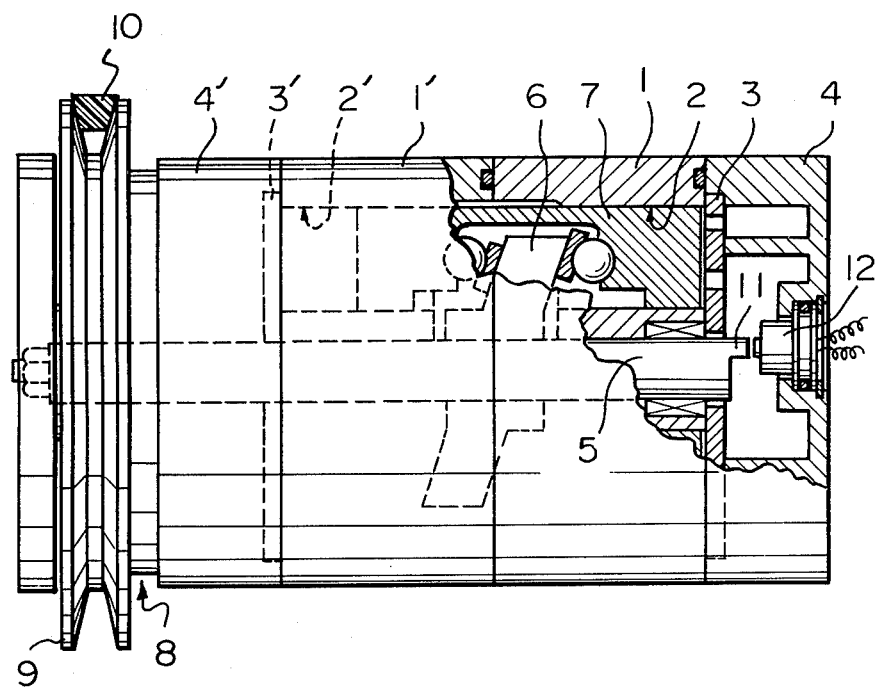
FIG. 1 is an elevation partly in section of a swash plate type compressor illustrated as an exemplary compressor.

Referring to FIG. 1 which illustrates a swash plate type compressor shown as an example of a compressor of a vehicle air conditioning system, reference numerals 1 and 1' designate a pair of cylinder blocks joined opposite to each other and provided with an appropriate number of pairs of cylinder bores 2 and 2' respectively. Valve plates 3 and 3' are disposed at the respective free ends of the cylinder blocks 1 and 1'. The free ends of the cylinder blocks 1 and 1' are closed by housings 4 and 4' respectively. A drive shaft 5 extends through the axial core of the cylinder blocks 1 and 1' and is rotatably supported. A swash plate 6 is fixedly mounted on the drive shaft 5 near the central part thereof and engaged with pistons 7 fitted in the cylinder bores 2 and 2' through a bearing assembly. The end portion of the drive shaft 5 projecting outside of the compressor from the housing 4' can be connected to or disconnected from a pulley 9 by an electromagnetic clutch 8. The pulley 9 is connected to the crankshaft pulley of an engine, not shown, by a power transmission belt 10. At the other end of the drive shaft 5 made of a magnetic material, there protrudes a detected part 11 at a position deviating from the axis of the drive shaft 5. A detecting unit 12 is disposed opposite to a part of the locus of revolution of the end face of the detected part 11. The detecting unit 12 comprises a bar magnet and a coil enclosing the bar magnet. The bar magnet is disposed with the end face of the bar magnet facing part of the locus of the revolution of the end face of the detected part 11. The combination of the detected part 11 and the detecting unit 12 will be hereinafter referred to as a revolution sensor 13.

In the compressor of such constitution as described hereinbefore, the swash plate 6 drives the pistons 7 to reciprocate within the cylinder bores 2 and 2' to perform the essential functions of the compressor, namely, suction, compression and discharge of the refrigerant, when the drive shaft 5 is caused to rotate by engaging the electromagnetic clutch 8. With the rotation of the drive shaft 5, the detected part 11 formed on the end surface of the drive shaft 5 comes periodically to a position opposite to the end face of the bar magnet of the detecting unit 12. Thus a pulsating voltage as shown in FIG. 5a is generated in the coil of the detecting unit 12 by the generating action of the variation of the magnetic flux density in the coil. At this stage, it should be noted that the period A of the voltage pulses and the amplitude B of the voltage pulses vary in inverse proportion and approximately in proportion to the revolving rate of the drive shaft 5 respectively.

Figure 2:
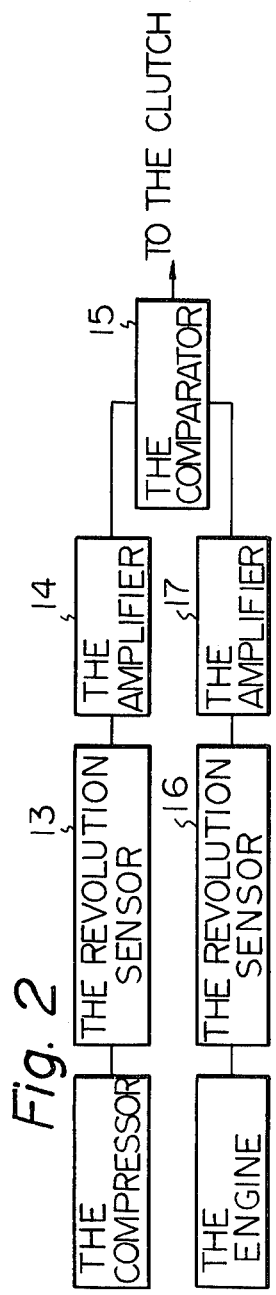
FIG. 2 is a block diagram of a first embodiment according to the present invention.

The first embodiment according to the present invention will be described hereinafter referring to FIG. 2. The output side of the revolution sensor 13 provided for the compressor is connected to the input side of an amplifier 14, while the output side of the amplifier 14 is connected to the input side of a comparator 15. A revolution sensor 16 similar to the revolution sensor 13 is also provided for the engine to detect the rotation rate of the engine. The output side of the revolution sensor 16 is connected to the input side of an amplifier 17, while the output side of the amplifier 17 is connected to the input side of the comparator 15. The comparator 15 compares the respective outputs of the amplifiers 14 and 17 and provides a signal to disengage the electromagnetic clutch 8 when the ratio of the output signal of the amplifier 14 to the output signal of the amplifier 17 becomes lower than a prescribed value or when the difference between the respective outputs of the amplifiers 14 and 17 becomes larger than a prescribed value.

In this embodiment, with the compressor operating in the normal state, the rate of rotation of the drive shaft 5 of the compressor is dependent on the rate of rotation of the engine, namely, the rate of rotation of the drive shaft 5 is subject to the ratio of the diameter of the pulley 9 to the diameter of the pulley of the engine and the rate of rotation of the engine and usually, the ratio is 1 to 1, hence the rate of rotation of the drive shaft 5 is the same as that of the engine. The voltage pulses generated by the revolution sensor 13 are sent to the comparator 15 after being amplified by the amplifier 14, while the voltage pulses generated by the revolution sensor 16 of the engine also are sent to the comparator 15 after being amplified by the amplifier 17. When the amplification factors of the amplifiers 14 and 17 are the same, the respective input signals from the amplifiers 14 and 17 are the same or proportional (proportional in the ratio between the diameters of the pulley 9 and the pulley of the engine side). In this operating state, the comparator 5 will not provide any signal to disengage the electromagnetic clutch 8. During the transient state which could lead to serious damage, such as seizure in the compressor resulting from faulty lubrication, the revolving rate of the compressor drops relative to the normal revolving rate due to increasing frictional resistance of the sliding surfaces, and consequently, the output of the amplifier 14 diminishes. Such malfunction of the compressor is detected through the detection of a reduction in the ratio of the output of the amplifier 14 to that of the amplifier 17 or the detection of the excess of the difference between the respective outputs of the amplifiers 14 and 17 over a prescribed value. When the malfunction of the compressor is thus detected, a signal is provided to disengage the electromagnetic clutch 8 to interrupt the compressor. Accordingly, the operation of the compressor can be interrupted previous to the complete seizure or damage in the compressor, and, hence, damage to the vehicle engine can also be prevented.

In this first embodiment, in a case when the original difference between the revolving rate of the compressor and that of the engine exists due to the constitution of the driving force transmitting mechanism, the comparator 15 is only necessary to be designed to provide a signal to disengage the electromagnetic clutch 8 by simply detecting the difference between the outputs of the amplifiers 14 and 17 provided that the respective amplification factors of the amplifiers 14 and 17 are selectively and appropriately determined so that the outputs of the amplifiers 14 and 17 are the same under normal operation of the compressor.

Figure 3:
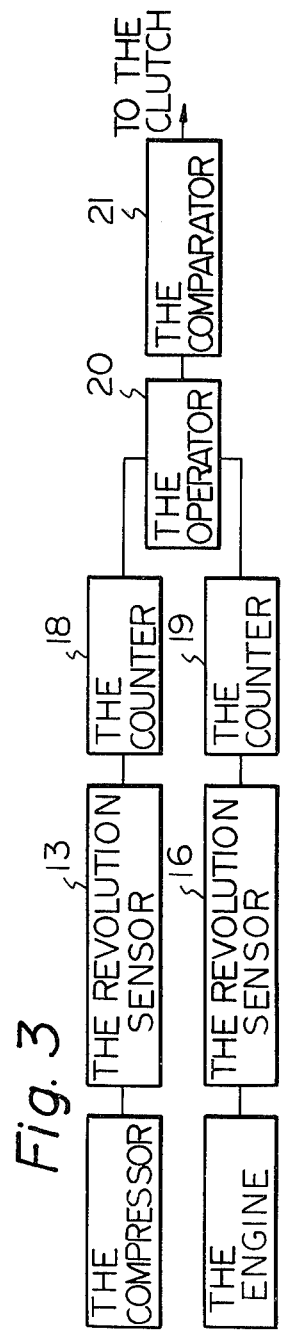
FIG. 3 is a block diagram of a second embodiment according to the present invention.

Referring now to FIG. 3 illustrating the block diagram of the second embodiment, revolution sensors 13 and 16 similar to those described hereinbefore are provided for the compressor and the engine, respectively. The revolution sensors 13 and 16 are connected to counters 18 and 19, respectively. The counters 18 and 19 count the number of pulse signals provided by the revolution sensors 13 and 16 per fixed period, then provide output signals of the respective magnitude proportional to the respective numbers of pulse signals counted. The output sides of the respective counters 18 and 19 are connected to the input side of an operator 20. The operator 20 is designed to provide output signals corresponding to the ratio between the outputs of the counters 18 and 19. A comparator 21 connected to the output side of the operator 20 is designed to provide a signal to desengage the electromagnetic clutch 8 when the output signal provided by the operator 20 deviates from a prescribed value.

In the second embodiment of such a design, the compressor and the engine operate at the respective revolving rates corresponding to the transmission ratio of the driving force transmitting means while the compressor is operating normally: Therefore, the value of the output of the operator 20, which is the ratio between the output signals provided by the counters 18 and 19 by counting the electromagnetic pulses provided by the revolution sensors 13 and 16, is the same as the prescribed value, and hence, the comparator 21 provides no output signal to disengage the electromagnetic clutch 8 and the operation of the compressor continues. During the transient state which could lead to serious damage, such as seizure in the compressor, as described regarding the first embodiment, the revolving rate of the compressor drops relative to the normal revolving rate, and then the output of the counter 18 diminishes. Consequently, the value of the output of the operator 20 deviates from the prescribed value and the comparator 21 provides a signal to disengage the electromagnetic clutch 8 so that the operation of the compressor is interrupted, and, hence, destructive damage to the compressor and the vehicle engine is prevented.

Figure 4:
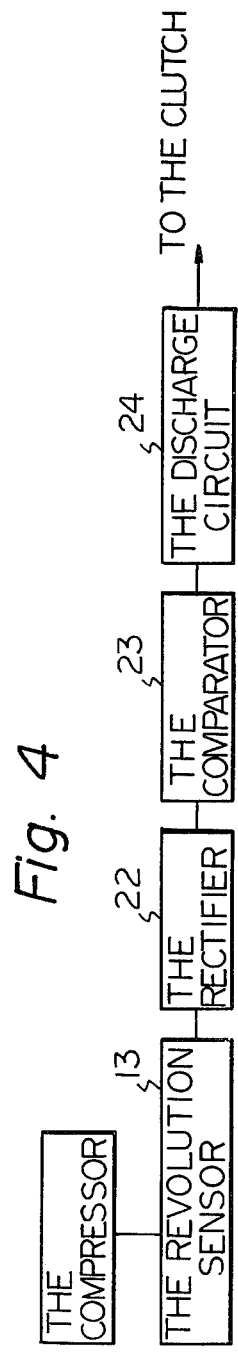
FIG. 4 is a block diagram of a third embodiment according to the present invention.

A third embodiment according to the present invention will be described referring to FIGS. 4 and 5. A revolution sensor 13 similar to those described hereinbefore is provided for the compressor. The revolution sensor 13 is connected to the input side of a rectifier 22. The output side of the rectifier 22 is connected to the input side of a comparator 23. The rectifier 22 rectifies the output signals provided by the revolution sensor 13 and provides pulse signals corresponding to the positive portion of the received signals. The comparator 23 is actuated by the pulse signals provided by the rectifier 22 to provide output signals of a square wave form as shown in FIG. 5c. A discharge circuit 24 disposed next to the comparator 23 continuously provides an output signal which increases with time (proportional to time) and when an input signal (the output signal of the comparator 23), exceeding a prescribed value, is applied to the discharge circuit 24, the output of the discharge circuit 24 returns temporarily to zero level. On the other hand, when no input signal is applied to the discharge circuit 24 from the comparator 23, the output of the discharge circuit 24 cannot return to zero level. As a result, the output of the discharge circuit 24 increases with time. Consequently, when the level of the output of the discharge circuit 24 exceeds a prescribed value $V_b$, the discharge circuit 24 provides an output signal to disengage the electromagnetic clutch 8.

With the compressor in the normal operating condition, the revolution sensor 13 provides an output signal of the wave form as shown in FIG. 5a. The positive portion of the output signal of FIG. 5a is converted into the pulse signals as shown in FIG. 5b. The amplitude B of the pulse signals is approximately proportional to the revolving rate of the compressor. While the compressor is in a normal operating condition and operating at a revolving rate above a prescribed lower limit of the revolving rate, the input $V_1$ to the comparator 23 is greater than the input $V_a$ at the prescribed lower limit of the revolving rate of the compressor. Every time the input signal $V_1$ is applied to the comparator 23, the comparator 23 becomes ON and provides an output signal to make the output $V_2$ of the discharge circuit 24 return to zero level; therefore, the output of the discharge circuit 24 will not exceed a prescribed limit output $V_b$. Accordingly, no output signal to disengage the electromagnetic clutch 8 is provided, and, hence, the compressor is allowed to continue the operation (Refer to FIGS. 5d and 5e). When the compressor is caused to come to a standstill through some malfunction, such as seizure, or when the revolving rate of the compressor is reduced below a prescribed abnormal limit of the revolving rate during the transient state before coming to a standstill, the pulse signal of FIG. 5b disappears or the pulse signal $V_1$ drops below the prescribed value $V_a$. Consequently, the comparator 23 does not become ON; hence the comparator 23 cannot make the discharge circuit 24 return to zero level so that the output of the discharge circuit 24 gradually increases until it finally exceeds the prescribed limit output level $V_b$ to provide a signal to disengage the electromagnetic clutch 8, thus interrupting the compressor driving force (FIGS. 5d and 5e). Thus severe breakage of the compressor and damage in the vehicle engine are prevented, since the transmission of the driving force to the compressor is instantly interrupted when the compressor is caused to come to a standstill due to some malfunction or while the compressor is in transition from the normal operating state to the abnormal operating state.

In the practical application, the present invention may be embodied so that the output of the comparator 23 exceeds the prescribed limit output level $V_b$ when the period $T_1$ of the input to the discharge circuit 24 exceeds the period $T_a$ of the pulse signal corresponding to the prescribed abnormal limit of the revolving rate of the compressor, because the period A of the pulse signal is inversely proportional to the revolving rate of the compressor.

It is obvious from what has been described hereinbefore that, according to the present invention, severe breakage of the compressor and damage to the vehicle engine can be prevented, since the transmission of the driving force to the compressor is instantly interrupted by detecting the drop of the revolving rate of the compressor below a prescribed revolving rate or below a reference revolving rate determined by the transmission relationship between the compressor and the engine, when some malfunction such as seizure, occurs in the compressor or the compressor is in the transition from a normal to an abnormal operating condition during operation.

We claim:

1. An apparatus for controlling a driving force transmitted from a vehicle engine, via an electromagnetic clutch, to a compressor of a vehicle air-conditioning equipment, comprising:
   sensor means for detecting the revolving rates of said compressor and said engine, and
   control means for providing a signal to disengage said electromagnetic clutch when the revolving rate of said compressor detected by said sensor means is reduced below a value corresponding to the revolving rate of said engine.

2. An apparatus for controlling a driving force transmitted from a vehicle engine, via an electromagnetic clutch, to a compressor of a vehicle air-conditioning equipment comprising:
   sensor means for detecting at least the revolving rate of said compressor, said sensor means comprising a first electromagnetical revolution sensor for generating electric voltage pulses in response to the revolving rate of said compressor, and a second electromagnetical revolution sensor for generating electric voltage pulses in response to the revolving rate of said vehicle engine; and
   control means for providing a signal to disengage said electromagnetic clutch when the revolving rate of said compressor detected by said sensor means is reduced below a reference revolving rate, said control means comprising a comparator connected to said first and second revolution sensors for providing a signal to disengage said clutch when the ratio of the amplitude of the electric voltage pulses from said first revolution sensor to the amplitude of the electric voltage pulses from said second revolution sensor is reduced below a prescribed value or when the difference between said amplitudes is increased over a prescribed value.

3. An apparatus for controlling a driving force transmitted from a vehicle engine, via an electromagnetic clutch, to a compressor of a vehicle air-conditioning equipment comprising:
   sensor means for detecting at least the revolving rate of said compressor, said sensor means comprising a first electromagnetical revolution sensor for generating electric voltage pulses in response to the revolving rate of said compressor, and a second electromagnetic revolution sensor for generating electric voltage pulses in response to the revolving rate of said vehicle engine; and
   control means for providing a signal to disengage said electromagnetic clutch when the revolving rate of said compressor detected by said sensor means is reduced below a reference revolving rate, said control means comprising a first counter connected to said first electromagnetic revolution sensor for counting said electric voltage pulses generated by said first revolution sensor and for providing output signals proportional to said counted electric voltage pulses, a second counter connected to said second electromagnetic revolution sensor for counting said electric voltage pulses generated by said second revolution sensor and for providing output signals proportional to said counted electric voltage pulses, an operator connected to said first and second counters for providing an output signal corresponding to the ratio of or the difference between said output signals of said first and second counters, and a comparator connected to said operator for providing an output signal to disengage said clutch when said output signal of said operator deviates from a predetermined value.

4. An apparatus for controlling a driving force transmitted from a vehicle engine, via an electromagnetic clutch, to a compressor of a vehicle air-conditioning equipment, comprising:
   sensor means for detecting at least the revolving rate of said compressor, said sensor means comprising a revolution sensor for electromagnetically generating electric voltage pulses in response to the revolving rate of said compressor; and
   control means for providing a signal to disengage said electromagnetic clutch when the revolving rate of said compressor detected by said sensor means is reduced below a reference revolving rate, said control means comprising a discharge circuit for discharging an electric output which increases with time, said discharging circuit being arranged for receiving said electric voltage pulses so that (i) said electric output returns to the zero level when the amplitude of any one of said electric voltage pulses is greater than a predetermined level, an (ii) said electric output continues to increase when said electric voltage pulses are absent and when said electric voltage pulses occur at a rate below a threshold rate corresponding to said reference revolving rate; and
   a controller capable of providing an output signal to disengage said clutch when said electric output of said discharge circuit exceeds a prescribed value.

* * * * *